Patented Nov. 22, 1927.

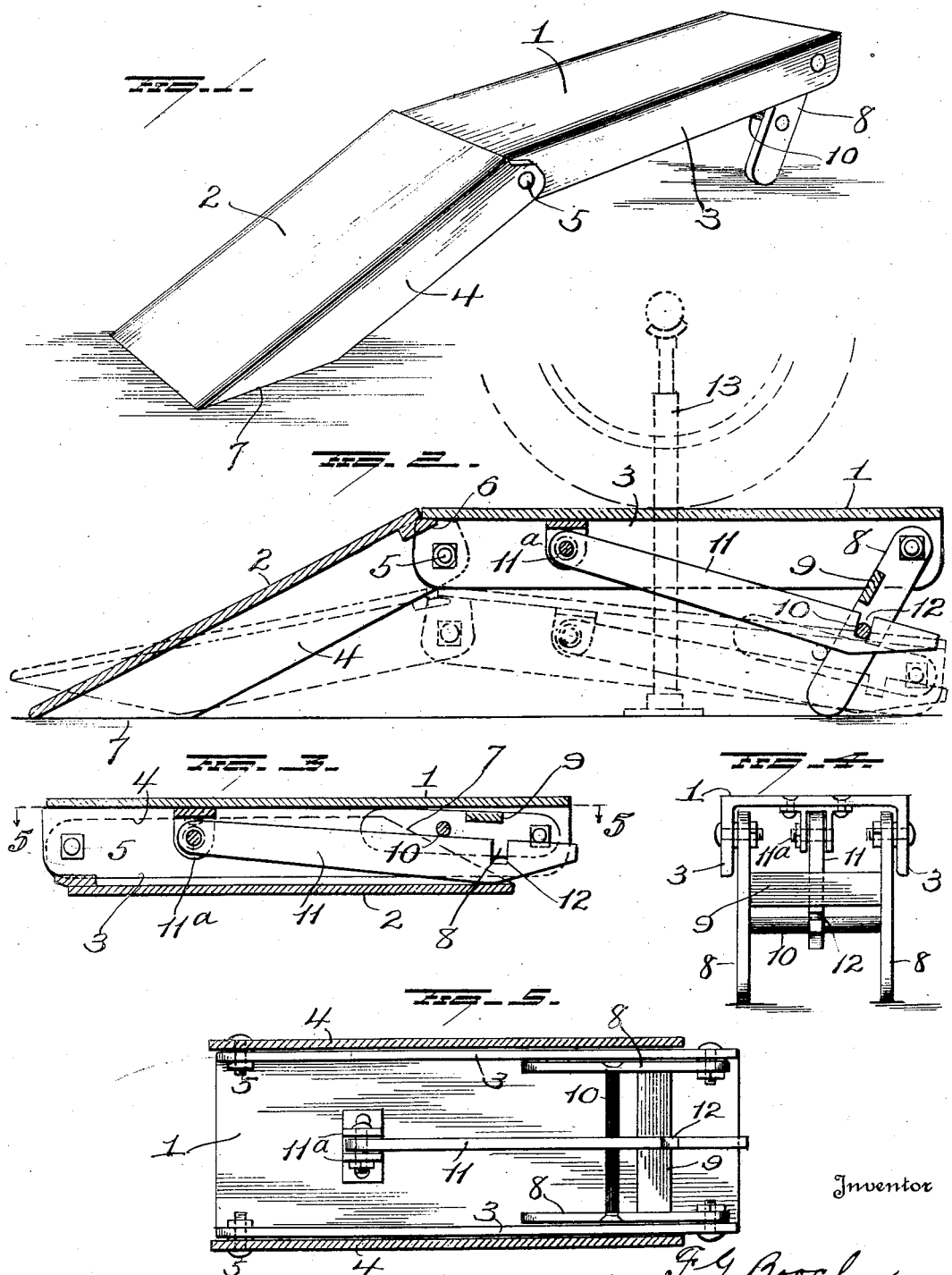
Nov. 22, 1927.  
F. G. BROCHU  
LIFTING DEVICE FOR VEHICLES  
Filed Nov. 20, 1925  
1,650,182

1,650,182

UNITED STATES PATENT OFFICE.

FREDERICK G. BROCHU, OF NEWARK, NEW JERSEY.

LIFTING DEVICE FOR VEHICLES.

Application filed November 20, 1925. Serial No. 70,362.

This invention relates to improvements in lifting devices for vehicles, such as automobiles,—one object of the invention being to provide a simple device whereby an automobile may be raised when a tire is to be changed or for other purpose, and to obviate the laborious task of raising the car with the use of a jack such as commonly employed.

A further object is to so construct the raising or lifting device that it will be operable to elevate a portion of a car without the application of power other than the propelling power of the motor of the car, and which device may then be tripped and permitted to collapse, leaving the wheel and axle supported in elevated position on an ordinary jack or other suitable device placed under the axle.

A further object is to so construct the device that it shall be durable and strong; so that it may be employed readily to elevate a portion of the car; so that it may be used as a base for a jack when soft ground is encountered; so that it may be employed as a wheel chock, and so that it may be compactly folded and stored in small space in the car.

With these and other objects in view, the invention consists in certain novel features of construction and combinations of parts as hereinafter set forth and pointed out in the claims.

In the accompanying drawings,—

Figure 1 is a perspective view of the device.

Figure 2 is a longitudinal sectional view illustrating an application of my improvement.

Figure 3 is a sectional view showing the device folded ready for storing.

Figure 4 is an end view, and

Figure 5 is a sectional view on the line 5—5 of Figure 3.

My improved device includes a platform member 1 and a runway member 2, each of which will preferably be made of suitable metal and provided at their side edges with depending flanges 3—4 respectively. The flanges of one of said members is made to overlap the flanges of the other member at adjacent ends of said members and pivot pins or bolts 5 connect said members as shown in Figures 1 and 2. The runway member 2 is provided at its end adjacent the platform member with an enlargement forming a flange 6 which underlies the end portion of the platform member 1, as clearly shown in Figure 2. The rear ends of the flanges 4 of the runway member 2 are beveled as at 7 whereby they may rest squarely upon the ground.

Legs 8 are pivotally connected with the flanges 3 of the platform member 1 adjacent the forward end of the latter and these legs are connected by a cross-bar 9. The lower ends of the legs 8 are rounded as shown in Figure 2 and at a suitable distance above their lower ends, a transverse rod 10 extends from one leg to the other to be engaged by a brace member 11. This brace member is pivotally connected between arms 11ª depending from the bottom of the platform member 2, preferably between the center and the rear end of said member. Near its free end, the brace member 11 is provided with a notch 12 open at its upper end so that said brace member may engage the transverse rod 10. The member 11 is so proportioned and the notch 12 so located that when said member engages the transverse rod 10, the legs 8 will be disposed in an inclined position as shown in Figure 2. When the parts are in the position shown in Figure 2, accidental dropping of the member 11 will be prevented by the frictional engagement of one wall of the slot 12 with the transverse rod 10. If desired, the arms 11ª to which the member 11 is pivoted may be sufficiently close to the latter to offer slight frictional resistance to the movement of the same.

The device may be placed either in front of or behind a wheel of a car and the car may then be driven under its own power so that the wheel will travel up the runway member 2 and become disposed upon the horizontal platform 1. A jack may now be placed under the elevated axle as illustrated by dotted lines in Figure 2. The operator will then depress the member 11 thus moving it out of operative relation to the transverse rod 10 thereby tripping the device so that it may collapse and assume the position illustrated by dotted lines in Figure 2, leaving the axle and wheel supported in elevated position by the jack 13 so that the tire may be readily changed or access be given for repair of other parts.

My improvements are particularly valuable for use in raising cars employing balloon tires as it is very difficult to insert a jack under the axle owing to the comparatively close proximity of the same to the ground when the tire is flat.

My improvements also provide simple means whereby a wheel may be chocked. The device may also be used as a base for a jack when soft ground is encountered.

My improved device may be folded compactly as shown in Figure 3 and stored in small space in the car. It will be noted that when the device is folded for storage or transportation, the flanges 3 fit between the flanges 4 and the tread members or webs are parallel so that the entire device is brought within a very small compass and may be easily handled, the brace and the legs being housed between the tread members and the flanges 3. While the flange 6 forms a lock to assist in preventing accidental collapse of the device when set up for use, the two members may move toward a position of alinement when the brace is tripped out of engagement with the legs. If the device be lifted with the brace free, it may be easily folded into the position shown in Fig. 3.

Having fully described my invention, what I claim as new and desire to secure by Letters Patent, is:

1. A device for the purpose set forth comprising a platform member, a runway member pivoted at one end to an end of the platform member, legs pivoted to the platform member adjacent the opposite end thereof, and a brace pivoted to the platform member between the ends thereof and adapted to be engaged with the legs whereby the platform member will be supported in a horizontal plane from end to end, the free end of the runway member being constructed to rest squarely on the ground.

2. A device of the character described comprising a platform member, a runway member pivotally connected with one end of the platform member, legs pivotally connected with the other end of the platform member, a transverse rod connecting said legs, and a member pivotally connected with the platform member between the ends thereof and having a notch in its upper edge engaging the transverse rod whereby the legs will be maintained in an inclined position, the end of the runway member being beveled to rest squarely on the ground.

3. A foldable device of the character described comprising a platform member having side flanges, a runway member having side flanges overlapping and pivotally connected with the side flanges of the platform member at the rear end of the latter, a flange at one end of the runway member to underlie the adjacent end portion of the platform member, legs pivotally connected with the side flanges of the platform member near the forward end of the latter, a transverse member connecting said legs, and a combined brace and trip member pivotally connected with the platform member between the ends thereof and having a notched portion to engage the transverse member connecting the legs, said notched portion being so located that the legs will be held disposed in inclined positions with relation to the platform member.

4. A device for the purpose set forth comprising a platform member having depending side flanges, a runway having depending side flanges pivoted at their upper ends to the side flanges of the platform member, and supporting and bracing elements mounted on the under side of the platform member and foldable against the same, the runway member being swingable to a position under the platform whereby the runway and platform members with their flanges will completely house the bracing and supporting elements.

In testimony whereof, I have signed this specification.

FREDERICK G. BROCHU.